Nov. 11, 1969   J. A. RACKI   3,477,337

UNIVERSAL INTERNAL THREAD FASTENER ASSEMBLY

Filed Feb. 27, 1968

INVENTOR.

BY John A. Racki

Wooster, Davis & Cifelli
ATTORNEYS.

United States Patent Office

3,477,337
Patented Nov. 11, 1969

3,477,337
UNIVERSAL INTERNAL THREAD FASTENER ASSEMBLY
John A. Racki, 180 Fresh Meadow Lane,
Milford, Conn. 06460
Continuation-in-part of application Ser. No. 618,377,
Feb. 24, 1967. This application Feb. 27, 1968, Ser.
No. 708,584
Int. Cl. F16b *13/04, 15/06, 39/28*
U.S. Cl. 85—73                                    10 Claims

ABSTRACT OF THE DISCLOSURE

A universal internal thread fastener assembly including a locking bolt and a distortion sleeve which is insertable into a threaded bore. The locking bolt has a spiral fluted shank twisted in the direction opposite to that of the threaded bore spiral, and has locking spurs extending outwardly from the shank for interaction with the bore threads, the spurs being arranged on a spiral formed in the same direction as the threaded bore spiral. The locking bolt is insertable into the distortion sleeve to rigidly hold the locking bolt in the threaded bore.

BACKGROUND OF THE INVENTION

This application is a continuation-in-part of my application Serial Number 618,377 for Universal Thread Adapter and Ram-Bolt, filed February 24, 1967, now abandoned.

This invention relates to universal fasteners for use in tapped bores having threads of various configuration and more particularly to a locking type bolt and a distortion sleeve for use therewith.

In recent years international commerce has increased very rapidly. The profusion of "foreign" machinery in all countries has caused serious problems resulting from the non-standardization of basic fastener parts, namely nuts and bolts. It is common knowledge that many European counteries use Metric Standard fasteners while in the United States we use American (National) Standard fasteners. For anyone who has ever owned a foreign made appliance or automobile and has tried to replaced a minor part, such as a nut or bolt the problem is pointedly brought home in a most frustrating way. The American Standard fasteners which are readily available here are "almost the right size." In manufacturing plants, however, wherein the continuous operation of machinery is imperative, the breakdown of such machinery due to the lack of a basic replacement part such as a nut or bolt may cause expensive "down time" of the machinery which is more than frustrating to the manufacturer. Another problem often arises because a threaded bolt of a given diameter may have threads of various pitches— viz, coarse, fine or extra fine. Thus it should be readily apparent that given a tapped bore diameter of substantially one-quarter inch a great number of substantially one-quarter inch diameter threaded bolts of various thread configuration will not mate therewith.

It would be desirable, therefore, to have a universal fastener which may be permanently secured in a threaded bore of a given diameter regardless of the type or pitch of the bore threads.

SUMMARY OF THE INVENTION

Accordingly, it is the primary object of my invention to provide a universal internal thread fastener assembly including a locking bolt and a distortion sleeve which may be inserted into a threaded bore for permanent securement of the bolt therein.

Another object of my invention is to provide a universal internal thread fastener assembly including a locking bolt having locking means which will interlock directly with the the bore threads to provide a positive locking action.

A still further object of my invention is to provide a universal internal thread fastener assembly including a locking bolt constructed to rotate as it is axially driven into a distortion sleeve seated in the threaded bore in order to set locking spurs on the bolt for positive locking with the bore threads upon withdrawal of the bolt.

Yet another object of my invention is to provide a universal internal thread fastener assembly including a distortion sleeve for use with the locking bolt which will firmly secure the bolt within the threaded bore.

To accomplish these objects, in one form I have provided a universal internal thread fastener assembly for use in threaded bores including a locking bolt and a distortion sleeve. The locking bolt comprises a spirally fluted shank the spiral being defined in a direction opposite to the spiral of the bore threads, and locking means located upon the shank and extending outwardly therefrom, being arranged on a spiral opposite to the direction of the spirally fluted shank and in the same direction as the spiral of the bore threads. The distortion sleeve is made of a deformable material having a wall thickness substantially the same as the threaded bore thread depth. Both the outer diameter of the bolt shank and the distortion sleeve are substantially the same as the smallest diameter of the threaded bore.

BRIEF DESCRIPTION OF THE DRAWING

Other objects and further details of that which I believe to be novel and my invention will be clear from the following description and claims taken with the accompanying drawing wherein:

DESCRIPTION OF THE PREFERRED EMBODIMENT

Figure 1:
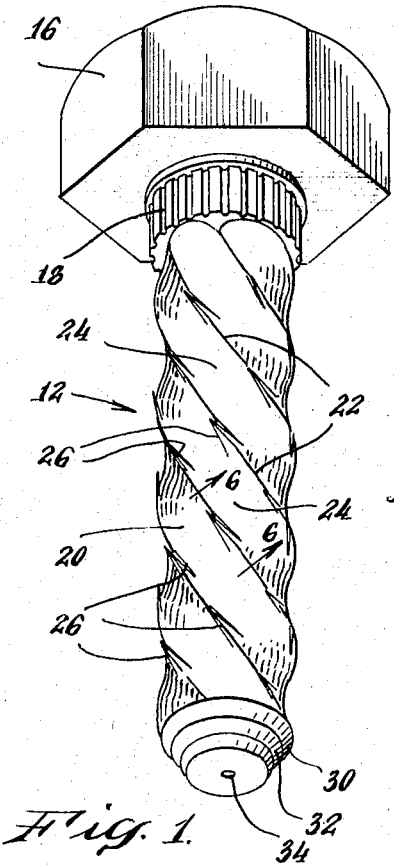
FIG. 1 is an enlarged perspective view of the locking bolt of my invention.
Figure 2:
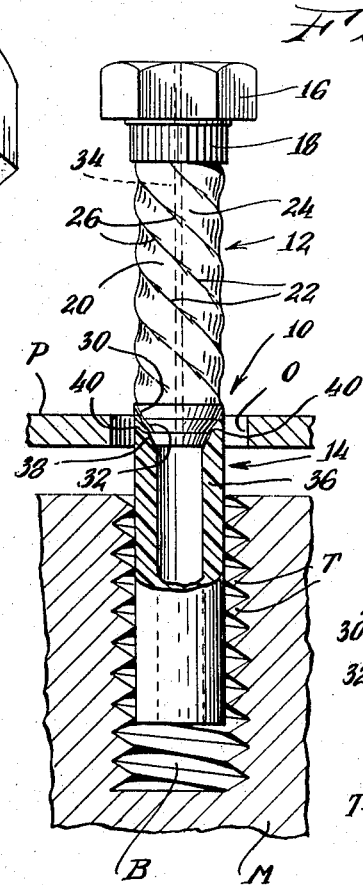
FIG. 2 is a side elevational view of the universal internal thread fastener assembly of my invention showing the locking bolt and distortion sleeve secured together as a unit with the distortion sleeve being inserted into the threaded bore.

With reference to the drawing, there is illustrated in FIG. 2 a universal fastener assembly, designated generally by the numeral 10, for use in an internally threaded bore B formed in a metal member M. The assembly comprises a locking bolt 12 and a distortion sleeve 14. If it is desired to permanently secure a plate P to the member M and a mating threaded bolt is not available for the threaded bore B, the universal fastener assembly 10 of my invention may be used. The bore B defines threads T which may be of American (National) Standard, Metric Standard or Whitworth Standard, or of coarse, fine or extra fine thread pitch in these standards, for a given diameter. My invention allows the user to insert a universal fastener assembly into a threaded bore of the given diameter regardless of the thread configuration.

Figure 5:
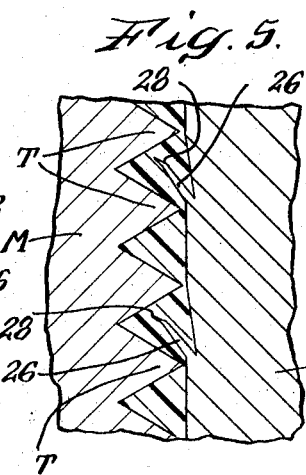
FIG. 5 is an enlarged sectional view showing the interaction of the locking spurs with the bore threads.
Figure 6:
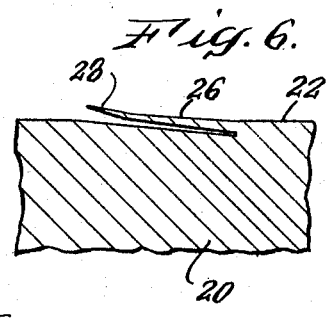
FIG. 6 is a sectional view taken substantially along line 6—6 of FIG. 1 showing a locking spur in detail.

The locking bolt 12 includes a head 16 which may be in the form of a standard hexagonal head, as shown, or may be of any other desired shape. A knurled collar 18 extends from the underside of the head 16, terminating in a fluted shank 20 which is of substantially the same diameter as the smallest inside diameter of the threaded bore B. The fluted shank, as viewed in cross section, includes cusps alternating with troughs, the locus of the cusps defining spiral ridges 22 and the locus of the troughs defining spiral channels 24. The direction of the spirals 22 and 24 is always opposite in direction to the spiral of the threads T. Therefore, for use in standard right hand threaded bores, the spirals 22 and 24 are formed in a counterclockwise direction. Locking spurs 26, clearly seen in FIGS. 5 and 6 are formed in the fluted shank 20 on the ridges 22 extending radially outwardly from the shank. The tip 28 of each spur 26 defines a sharp point for penetration through the distortion sleeve 14 as will become apparent subsequently. If desired the tips 28 may be bent outwardly as shown. The spurs 26 are arranged upon a spiral in the direction opposite to the direction of the spirally fluted shank 20. As illustrated, for use in a right hand threaded bore the spurs are arranged upon clockwise spirals. The shank 20 terminates in a chamfered end 30 having a securing groove 32 therein. A central axial passage 34 extends the length of the bolt forming an air purger to allow the bolt to be driven into the bore B.

The distortion sleeve 14 comprises a tubular length of a deformable material such as a cold flow conforming material, for example plastic, copper, lead or any other suitable material. The outer diameter of the sleeve is of substantially the same diameter as the smallest inside diameter of the threaded bore B and therefore has the same outer diameter as the fluted shank 20 of the locking bolt 12. I have chosen the wall 36 to be of substantially the same thickness as the depth of the threads T. At one end of the sleeve a bevelled rim 38 is formed which is complementary to the chamfered end 30 of the locking bolt. A securing flange 40 positioned at approximately the center of the bevelled rim extending radially inwardly may snap into the securing groove 32 of the bolt to retain the bolt 12 and the sleeve 14 together as a unit defining the universal fastener assembly 10.

Figure 3:
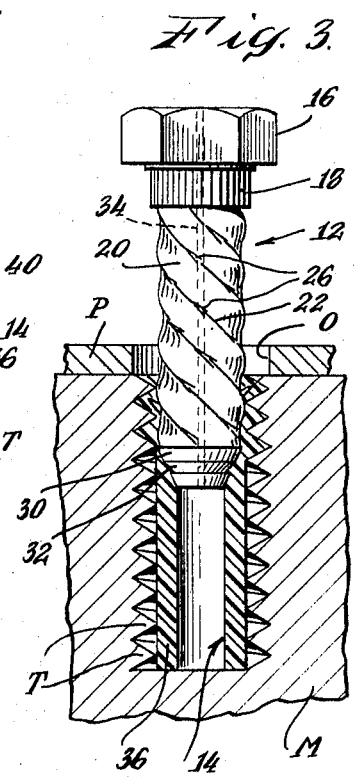
FIG. 3 is a side elevational view similar to FIG. 2 showing the locking bolt partially driven into the distortion sleeve.
Figure 4:
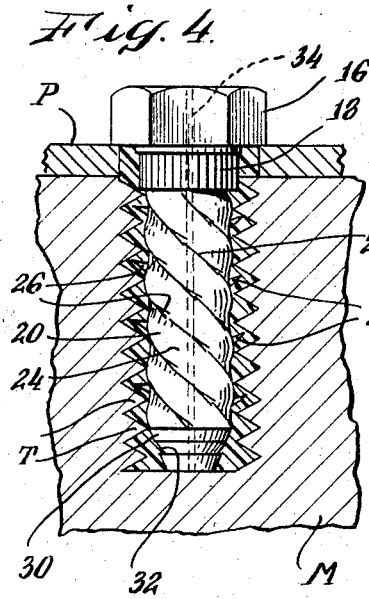
FIG. 4 is a side elevational view similar to FIG. 2 showing the locking bolt and distortion sleeve fully inserted in the threaded bore.

When it is desired to utilize the unique fastener assembly 10 of my invention, the sleeve portion 14 of the assembly is passed through the opening O in the plate P and is introduced into the bore B. It should be understood, of course, that the locking bolt 12 and distortion sleeve 14 need not be secured together in which case the sleeve alone is initially introduced to the bore. The locking bolt is driven into the distortion sleeve by application of an axial driving force to the head 16 thereof. This causes the chamfered end 30 of the bolt to cooperate with the bevelled rim 38 of the sleeve to deform the top of the sleeve into the uppermost threads T of the bore B to lock the sleeve in the bore thereby preventing axial collapsing of the sleeve as the bolt is driven (note FIG. 3). Further driving causes the bolt to rotate in a counterclockwise direction as the spiral ridges 22 cut through the sleeve 14, spreading it completely into the threads T. Counterclockwise rotation of the bolt allows the locking spurs 26 to slip past the threads T. It should be recalled that I have provided an air purging passage 34 which allows the bolt to be driven. As the sleeve is distorted it flows around the spurs 26 (note FIGS. 4 and 5) enabling the spurs to get a purchase into the deformable material. The sleeve material is also compressed as it must fill a smaller volume, thus causing it to become substantially harder and provide a stronger bonding action. The knurled collar 18 is also surrounded by the distorted sleeve material which closely conforms thereto.

Once the locking bolt has been driven as described above and illustrated in FIG. 4, it is permanently in place and may not be removed except for the use of a special tool provided therefor. The use of ordinary tools, such as a wrench or axial pulling tool, to back off the bolt will result in further locking of the bolt. If, for example, the user were to rotate the bolt head 16 in a counterclockwise direction in the usual manner of removing a right-hand threaded bolt of the counterclockwise spiral ridges 22 will tend to drive the bolt in deeper. If, however, a clockwise torque is applied, the spiral ridges 22 will start to drive the bolt upwardly and the upwardly moving locking spurs 26 arranged on a clockwise spiral will cut through the distorted sleeve to interlock with the underside of the clockwise threads T in a criss-cross manner, regardless of the thread pitch. It should be recalled that the tips 28 of the locking spurs 26 may be deformed outwardly from the shank to urge the spurs outwardly as they cut through the sleeve, and will drive deeper under the threads T. If an upward axial force is applied to the head 16, the spiral ridges 22 will cause the bolt to rotate in a clockwise direction and therefore the locking spurs will cut through the distorted sleeve to seat themselves under the threads T.

Thus it should be apparent that the locking action between the locking bolt 12 and the metal member M is direct and that the distortion sleeve 14 is provided as a rigidifying element. As has been fully described above the improved interlocking action of my universal internal thread fastener assembly is derived from the unique configuration of the locking bolt having a spirally fluted shank which spiral is opposite in direction to the bore thread spiral, and a plurality of locking spurs arranged on a spiral opposite in direction to the spiral of the fluted shank.

It should be understood that the present disclosure has been made only by way of example and that numerous changes in details of construction and the combination and arrangement of parts may be resorted to.

What is claimed is:

1. The combination comprising: a workpiece having a threaded bore; and a locking bolt secured in said threaded bore including a head, a spirally fluted shank, the outer diameter of said shank being substantially the same as the smallest diameter of the threaded bore, the spiral being defined in a direction opposite to the spiral of the bore threads, and locking means located upon said shank and extending radially outwardly therefrom, said locking means being arranged on a spiral opposite to the direction of said spirally fluted shank and in the same direction as the spiral of the bore threads, whereby once said bolt has been inserted into the tapped bore removal thereof is prevented by the interlocking of said locking means with the threads of the threaded bore.

2. The combination defined in claim 1 wherein the spiral of said fluted shank is in a counterclockwise direction and the spiral upon which said locking means is arranged is in a clockwise direction.

3. The combination defined in claim 1 wherein: said fluted shank defines spiral ridges alternating with spiral channels; and said locking means comprises a plurality of spurs each located upon and extending outwardly from said ridges.

4. The combination defined in claim 1 wherein axial passage is defined entirely through said bolt to form an air purger.

5. The combination defined in claim 1 wherein: said fluted shank defines spiral ridges alternating with spiral channels, said spirals being formed in a counterclockwise direction; said locking means comprises a plurality of spurs each located upon and extending outwardly from said ridges, and arranged upon a spiral formed in a clockwise direction; and said bolt defines an axial passage entirely therethrough to form an air purger.

6. The combination defined in claim 1 additionally comprising a distortion sleeve made of a deformable material having an initial outer diameter substantially the same as the outer diameter of said fluted shank, said sleeve being introduced into the threaded bore and said bolt being axially driven into said sleeve to deform said sleeve into conformance with the threads of said bore to rigidly position said bolt in the threaded bore.

7. The combination defined in claim 6 wherein: said bolt includes a chamfered lead end located at the end of said fluted shank remote from said head; and said sleeve includes a bevelled rim at one end thereof to receive said chamfered lead end, whereby as said bolt is axially driven into said sleeve, said chamfered lead end will spread said sleeve into the threads and around said locking means.

8. The combination defined in claim 7 wherein cooperating securing means are formed on said chamfered lead end and said bevelled rim to retain said bolt and said sleeve together as a unit.

9. The combination defined in claim 6 wherein said bolt includes a knurled collar located between said shank and said head to further prevent backing out of said bolt once said bolt has been driven into locking position.

10. The combination defined in claim 6 wherein: said fluted shank defines spiral ridges alternating with spiral channels, said spirals being formed in a counterclockwise direction; said locking means comprises a plurality of spurs each located upon and extending outwardly from said ridges, and being arranged upon a spiral formed in a clockwise direction; an axial passage is defined entirely through said bolt to form an air purger; said bolt includes a chamfered lead end located at the end of said fluted shank remote from said head; said sleeve includes a bevelled rim at one end thereof to receive said chamfered lead end; and cooperating securing means are formed on said chamfered lead end and said bevelled rim to retain said bolt and said sleeve together as a unit.

References Cited

UNITED STATES PATENTS

| | | | |
|---|---|---|---|
| 2,190,883 | 2/1940 | Pauze | 85—21 |
| 2,424,602 | 7/1947 | De Swart | 85—72 |
| 2,542,144 | 2/1951 | Kearns | 85—72 |
| 2,711,520 | 6/1955 | Kernen et al. | 85—21 |
| 2,745,521 | 5/1956 | White. | |
| 2,774,098 | 12/1956 | Tieri | 85—82 |
| 3,042,961 | 7/1962 | Tieri | 85—82 |
| 3,124,188 | 3/1964 | Muenchinger | 151—22 |
| 3,191,864 | 6/1965 | Moses | 85—63 |
| 3,319,918 | 5/1967 | Rapata | 85—82 |

FOREIGN PATENTS

| | | |
|---|---|---|
| 103,790 | 4/1938 | Australia. |
| 1,191,633 | 4/1965 | Germany. |
| 321,922 | 10/1934 | Italy. |

MARION PARSONS, Jr., Primary Examiner

U.S. Cl. X.R.

85—21, 82; 151—22